US011864496B2

(12) United States Patent
Breure

(10) Patent No.: US 11,864,496 B2
(45) Date of Patent: Jan. 9, 2024

(54) SELF-PROPELLED AGRICULTURAL MACHINE

(71) Applicant: Ploeger Oxbo Europe B.V., Roosendaal (NL)

(72) Inventor: Hendrik Willem Breure, Roosendaal (NL)

(73) Assignee: Ploeger Oxbo Europe B.V., Roosendaal (NL)

(*) Notice: Subject to any disclaimer, the term of this patent is extended or adjusted under 35 U.S.C. 154(b) by 394 days.

(21) Appl. No.: 17/268,820

(22) PCT Filed: Aug. 20, 2019

(86) PCT No.: PCT/NL2019/050538
§ 371 (c)(1),
(2) Date: Feb. 16, 2021

(87) PCT Pub. No.: WO2020/046114
PCT Pub. Date: Mar. 5, 2020

(65) Prior Publication Data
US 2021/0352845 A1    Nov. 18, 2021

(30) Foreign Application Priority Data

Aug. 30, 2018    (NL) .................................... 2021519

(51) Int. Cl.
*A01D 57/20*        (2006.01)
*A01B 63/02*        (2006.01)
(Continued)

(52) U.S. Cl.
CPC ............ *A01D 57/20* (2013.01); *A01B 63/023* (2013.01); *A01B 73/02* (2013.01); *A01D 84/00* (2013.01)

(58) Field of Classification Search
CPC ....... A01B 63/023; A01B 73/02; A01B 73/00; A01D 57/20; A01D 84/00
See application file for complete search history.

(56) References Cited

U.S. PATENT DOCUMENTS 3,177,638 A * 4/1965 Johnson ............... A01B 73/067
56/7
3,345,808 A * 10/1967 Van Der Lely ...... A01D 34/246
56/6
(Continued)

FOREIGN PATENT DOCUMENTS

DE         43 41 610 A1    6/1995
EP           0373406 A1 *  6/1990    ........... A01D 41/144
(Continued)

*Primary Examiner* — Arpad F Kovacs
(74) *Attorney, Agent, or Firm* — Nixon Peabody LLP

(57) ABSTRACT

A self-propelled agricultural machine, for example, a self-propelled merger, is provided with at least one motor, at least two elongate units for, in use, performing an agricultural operation on the land, a front wheel axle, and a rear wheel axle situated at a distance from the front wheel axle. The front wheel axle and/or the rear wheel axle is driven by the motor for displacing the agricultural machine. Each elongate unit is displaceable from a transportation position to a working position and vice versa by a folding mechanism, so that the maximum width of the self-propelled agricultural machine is smaller in the transportation position of the units than in the working position of the units. In the working position, the agricultural operation on the land is performed substantially along the length of each elongate unit.

22 Claims, 14 Drawing Sheets

(51) Int. Cl.
*A01B 73/02* (2006.01)
*A01D 84/00* (2006.01)

(56) References Cited

U.S. PATENT DOCUMENTS

| | | | | |
|---|---|---|---|---|
| 4,184,314 | A * | 1/1980 | Hobbs | A01D 75/002 56/364 |
| 4,409,780 | A * | 10/1983 | Beougher | A01B 73/02 56/228 |
| 4,903,470 | A * | 2/1990 | Hemker | A01D 41/144 56/297 |
| 5,893,262 | A * | 4/1999 | Harbach | C05F 17/943 56/351 |
| 5,911,625 | A * | 6/1999 | von Allworden | A01D 41/144 460/119 |
| 6,282,875 | B1 * | 9/2001 | Holtkotte | A01B 73/00 56/228 |
| 6,688,093 | B1 * | 2/2004 | Franet | A01B 51/026 56/15.5 |
| 7,003,938 | B2 * | 2/2006 | Erdmann | A01D 41/144 212/223 |
| 7,165,384 | B1 * | 1/2007 | Wubbels | A01D 75/002 56/15.6 |
| 8,091,331 | B2 * | 1/2012 | Dow | A01B 73/02 56/192 |
| 8,863,489 | B2 * | 10/2014 | Landon | A01D 89/002 56/192 |
| 8,919,088 | B2 * | 12/2014 | Dow | A01D 57/20 56/192 |
| 9,173,345 | B2 * | 11/2015 | Cressoni | A01D 45/021 |
| 9,999,178 | B2 * | 6/2018 | Leiston | A01D 89/003 |
| 2003/0217537 | A1 * | 11/2003 | Schlesser | A01B 73/067 56/14.9 |
| 2004/0200203 | A1 * | 10/2004 | Dow | A01B 73/02 56/375 |
| 2005/0028509 | A1 * | 2/2005 | Viaud | A01D 89/008 56/341 |
| 2005/0172598 | A1 * | 8/2005 | Billard | A01D 43/077 56/192 |
| 2005/0252183 | A1 * | 11/2005 | Hironimus | A01D 75/30 56/6 |
| 2006/0174599 | A1 * | 8/2006 | Hironimus | A01D 75/303 56/6 |
| 2006/0254238 | A1 * | 11/2006 | Walter | A01D 34/661 56/15.2 |
| 2006/0254240 | A1 * | 11/2006 | Krone | A01D 43/083 56/16.6 |
| 2012/0060458 | A1 | 3/2012 | Hironimus | |
| 2014/0260168 | A1 * | 9/2014 | Clark | A01D 89/002 56/192 |
| 2015/0020492 | A1 * | 1/2015 | Schwer | A01D 84/00 56/377 |
| 2015/0128552 | A1 * | 5/2015 | Dow | A01D 78/002 56/377 |

FOREIGN PATENT DOCUMENTS

| | | | | |
|---|---|---|---|---|
| EP | 1932416 A1 * | 6/2008 | | A01B 73/065 |
| EP | 2 661 169 B1 | 7/2016 | | |
| EP | 3153000 A1 * | 4/2017 | | A01D 34/006 |
| WO | WO 93/02542 A1 | 2/1993 | | |
| WO | WO 2012/094331 A2 | 10/2012 | | |
| WO | WO 2012/094331 A3 | 4/2018 | | |

\* cited by examiner

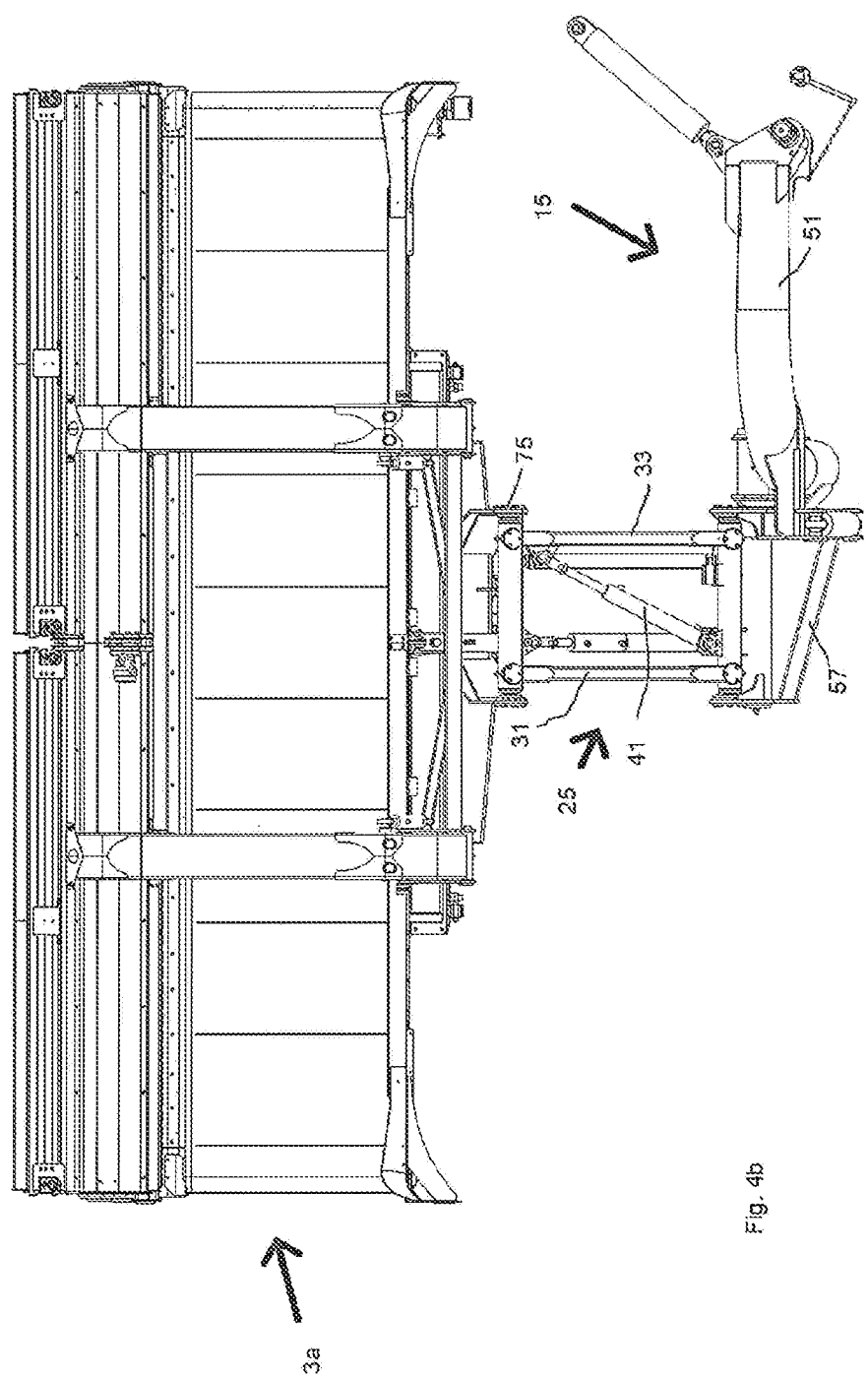

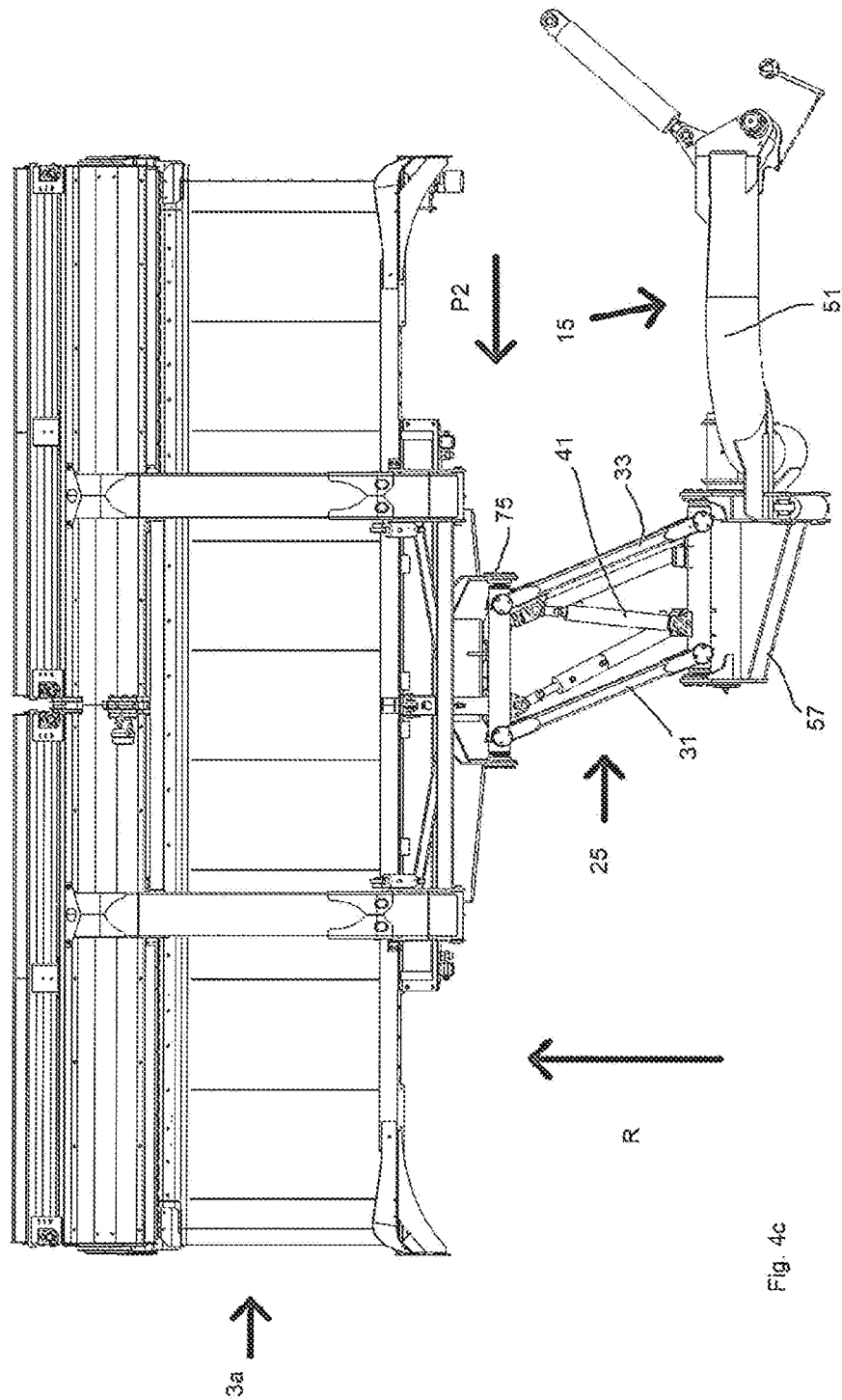

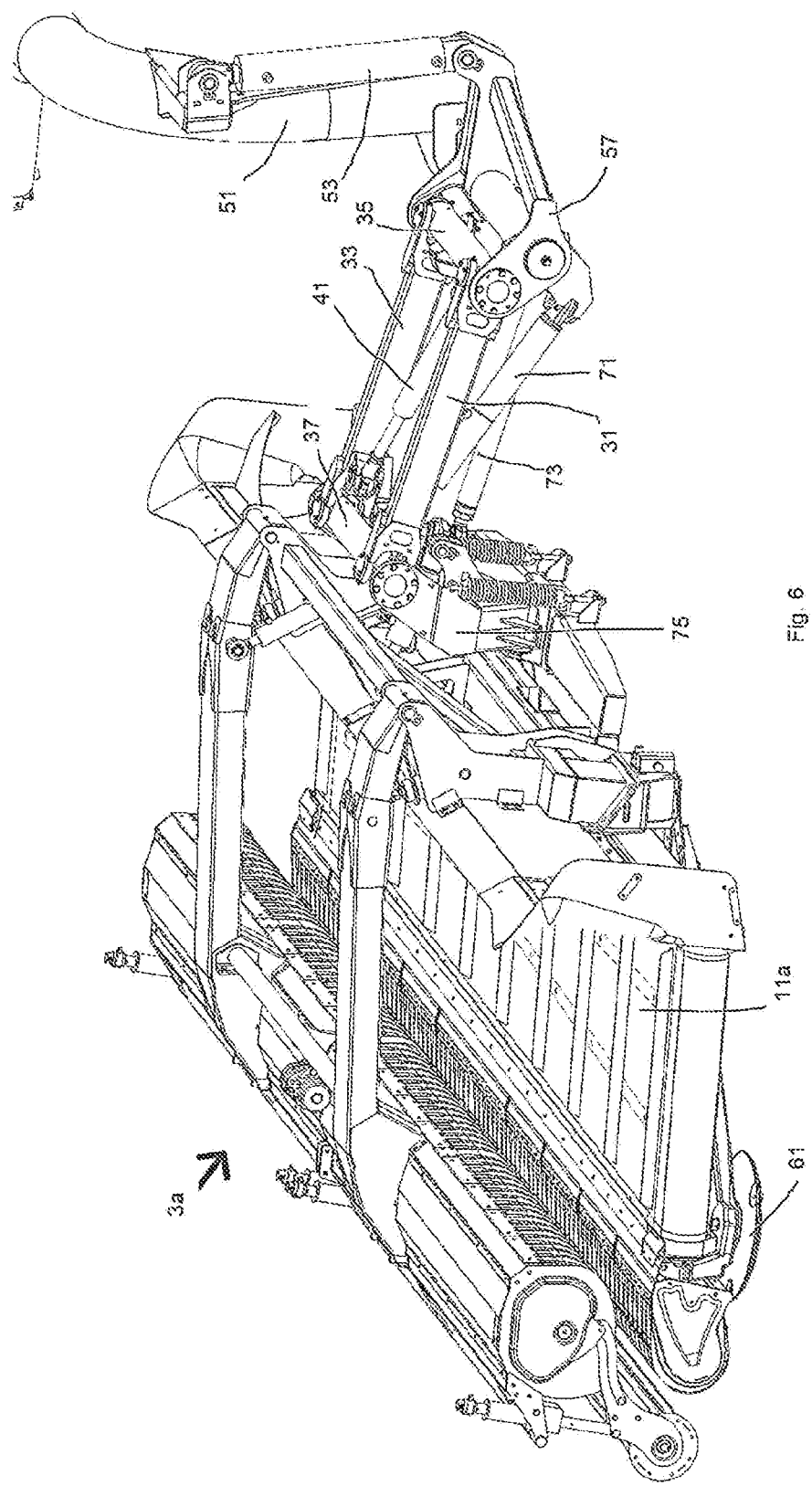

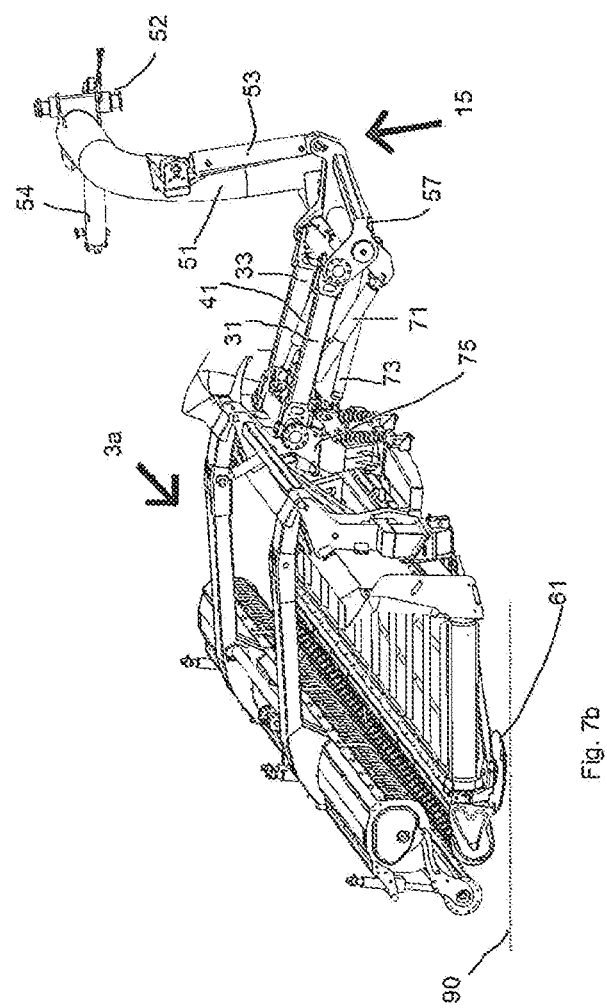

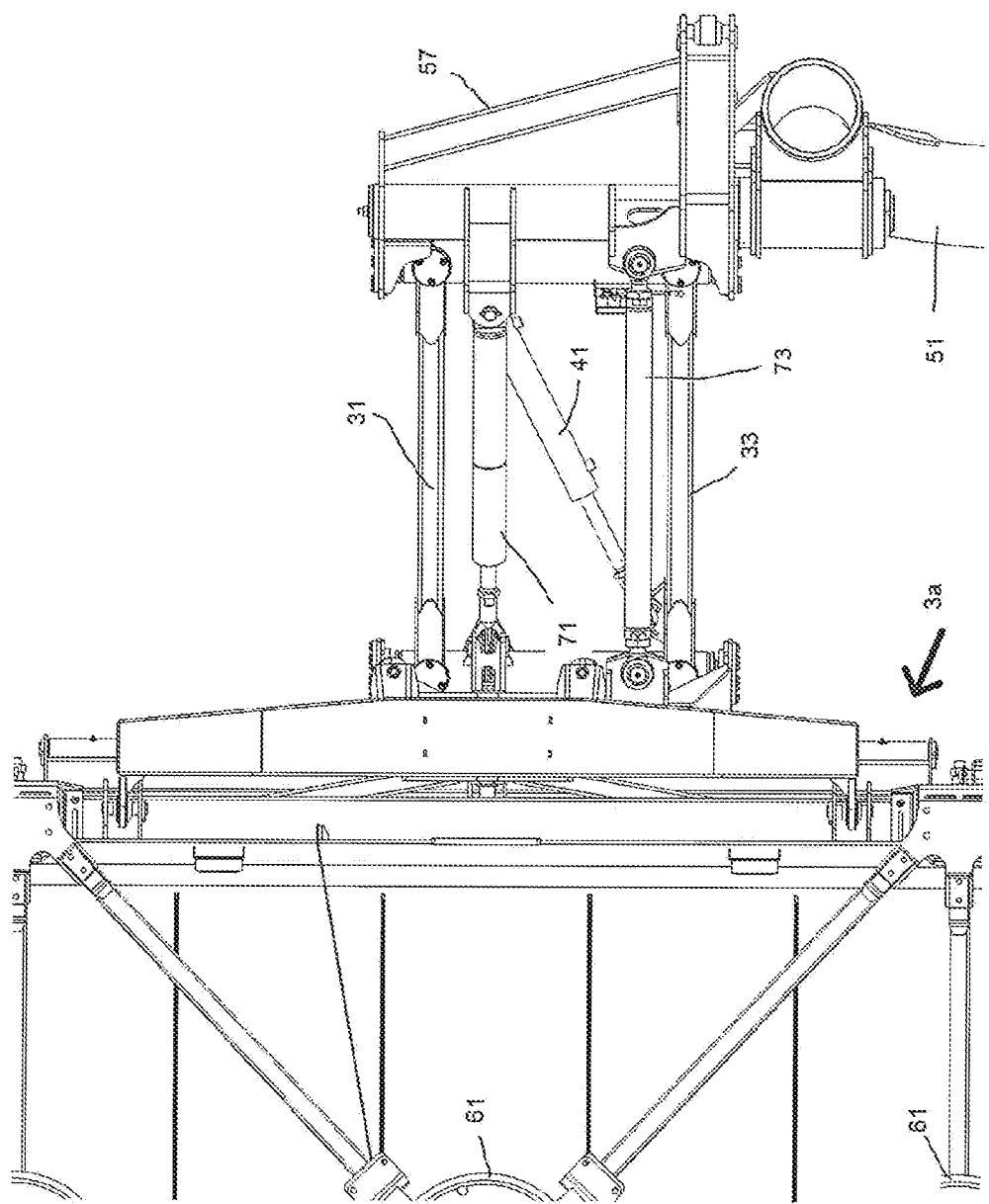

SELF-PROPELLED AGRICULTURAL MACHINE

CROSS-REFERENCE TO RELATED APPLICATIONS

This application is a national stage of Application No. PCT/NL2019/050538 filed Aug. 20, 2019 that claims the benefit of priority from Netherlands Application No. 2021519 filed on Aug. 30, 2018, which are both incorporated by reference in their entireties.

FIELD OF INVENTION

The present invention relates to a self-propelled agricultural machine, for example a self-propelled merger, which self-propelled agricultural machine is provided with at least one motor, at least two elongate units for, in use, performing an agricultural operation on the land, a front wheel axle and a rear wheel axle situated at a distance from the front wheel axle, wherein the front wheel axle and/or the rear wheel axle can be driven by means of the motor for displacing the agricultural machine, wherein each elongate unit is displaceable from a transportation position to a working position and vice versa by means of a folding mechanism, so that the maximum width of the self-propelled agricultural machine is smaller in the transportation position of the units than in the working position of the units, wherein, in the working position, the agricultural operation on the land can be performed substantially along the length of each elongate unit.

BACKGROUND OF INVENTION

Such a self-propelled merger (belt rake) is known, for example, from EP 2 661 169 A2. In the self-propelled agricultural machine disclosed in this publication, in the working position of the machine, three elongate units are situated virtually in a line in order to perform an agricultural operation on the land, as is, for example, shown in FIG. 1 of EP 2 661 169 A2. The outermost units can be moved from a transportation position to a working position and vice versa by means of a folding mechanism, whereas the central unit can be folded up from a position situated near the land to a position situated further from the land by means of a folding mechanism. The known self-propelled agricultural machine therefore comprises outermost units which can be moved from a transportation position for transport on, for example, public roads, as is shown in FIG. 7 of EP 2 661 169 A2, to a fixed working position.

SUMMARY OF INVENTION

In a first aspect, it is an object of the invention to provide an improved self-propelled agricultural machine. In a second aspect, it is an object of the invention to provide a self-propelled agricultural machine in which the units can assume different configurations in the working position in order to be able to perform the agricultural operation on the land in different ways.

This object of the invention is achieved by the self-propelled agricultural machine as claimed in claim 1.

In the claimed self-propelled agricultural machine, at least one of the at least two elongate units is provided with a displacement unit by means of which, in the working position, the distance between the at least two elongate units is adjustable, viewed in the longitudinal direction of the at least two elongate units.

By means of the displacement unit, a displacement, a so-called side-shift, can be performed by at least one of the two elongate units in the working position of these units, as a result of which the distance between the units can be varied in the working position. In the working position means in a position of the units in which the agricultural operation on the land can be performed substantially along the entire length of the elongate units. The agricultural operation may be, for example, picking up a plant material and laying down the plant material placing in a row or windrow. In this way, it is for example possible, depending on the circumstances, to perform or not to perform an agricultural operation under the agricultural machine by ensuring that the distance between the units in the working position is sufficiently great. For example, as a result of the distance between the units in the working position, a so-called central windrow is possible with an agricultural machine designed as a merger. It is also possible to temporarily position the units against each other, without any intermediate distance, so that an agricultural operation can be performed along the entire length of the two units positioned against each other. The length of a single elongate unit may be, for example, 5 metres, with the length extending at right angles to the direction of travel of the agricultural machine in the working position of the unit. By means of the displacement unit, it is possible to set the agricultural machine at different working widths, as a result of which the agricultural machine is flexible in the working position.

In the working position, the at least one elongate unit is situated in front of the first wheel axle, the front wheel axle, with the at least one elongate unit being largely or completely situated behind the first wheel axle in the transportation position. In this way, the width of the agricultural machine in the transportation position can be greatly reduced, for example by at least a factor of one and a half (1.5) compared to the working position of the elongate units. Preferably, the factor of width working position:width transportation position of the agricultural machine is at least 2:1.

In an aspect, the elongate unit, in its working position, is displaceable by means of the displacement unit in at least three positions with respect to the other unit. For example, the unit is displaceable from a centre position to the left with respect to the direction of travel to a first end position and is also displaceable from a centre position to the right with respect to the direction of travel to a second end position in order to vary the distance between the units. In such an agricultural machine, the distance can be adjusted relatively quickly to the distances which, in use, are the most common between the units in the working position. In addition, the number of distances can easily be expanded if the other unit is also provided with a displacement unit which is also able to set the other unit in three different positions with respect to the other unit. The various distances to be set correspond, for example, to preferred working widths for the agricultural operation to be performed on the land.

It is likewise possible for the displacement unit to position a unit or both units at each position between no distance between the units in the working position and maximum distance between the units in the working position in order to perform the agricultural operation on the land using the agricultural machine.

In a particularly reliable and low-maintenance embodiment, the displacement unit is provided with a system of rods, i.e. a linkage, and with at least one drive member, for example in the form of a hydraulic cylinder. By placing the rods/bars in the system of rods in the shape of a parallelogram, it is possible to provide a reliable and robust displacement unit in a simple and reliable manner. In addition, such a system of rods is easy to maintain and check. By arranging the drive member diagonally in the parallelogram, only a single drive member is required in the displacement unit for displacing the unit in its working position in a direction extending at right angles to the direction of travel of the agricultural machine, despite the relatively large mass of the elongate unit. In addition, the system of rods can easily be combined with the folding mechanism of each unit. Finally, the agricultural machine comprises a pressure-regulating mechanism to provide a constant or temporary pressure relief of the unit on the ground. By using a swinging member which is pivotably connected in a sprung manner between the elongate unit and the displacement unit, an improved and optimum ground-contour following ability of the unit in the working position is possible in order to perform the agricultural operation. The displacement unit furthermore comprises a displacement mechanism in the form of a hydraulic cylinder by means of which the elongate unit can easily be adjusted to the front or to the back at a variable angle of inclination with respect to the ground in order to set the working depth of the unit for performing the agricultural operation.

Finally, the invention also relates to the use of an above-described self-propelled agricultural machine. In order to avoid unnecessary repetitions, the reader is referred to the advantages of the use of the agricultural machine which have already been described in this document regarding the self-propelled agricultural machine in use. With a merger, it is a particular advantage of the displacement unit that it makes it possible for plant material, such as hay, grass or alfalfa, to be laid on the land as a lateral windrow or a central windrow without the merger having to stand still for a long time during a changeover between lateral windrow and central windrow in order to change between a lateral windrow and a middle windrow. Such a changeover can be performed within a short period of time of less than a minute or a few minutes at most. In addition, the width of the windrow to be formed on the land may be adapted to the desired width and/or to the circumstances on the land.

The above-described aspects will be explained below by means of an exemplary embodiment in combination with the figures. However, the invention is not limited to the exemplary embodiment described below. Rather, a number of variants and modifications are possible which also use the inventive idea and therefore fall within the scope of protection. In particular, the possibility of combining the features/aspects which are only mentioned in the description and/or shown in the figures with the features of the claims, in so far as compatible, should be mentioned.

BRIEF DESCRIPTION OF THE DRAWINGS

FIGS. 4a-c show different positions which the elongate unit shown in FIGS. 1-3 can assume by means of the displacement unit;

FIG. 6 shows a perspective view of the components of the merger shown in FIG. 5;

FIGS. 7a-b show the elongate unit in a folded-up state and in a working position;

FIG. 8 shows a bottom view of part of the folding mechanism, the displacement unit and a part of the elongate unit;

In the figures, identical components are denoted by the same reference signs.

DETAILED DESCRIPTION OF THE INVENTION

Figure 1:
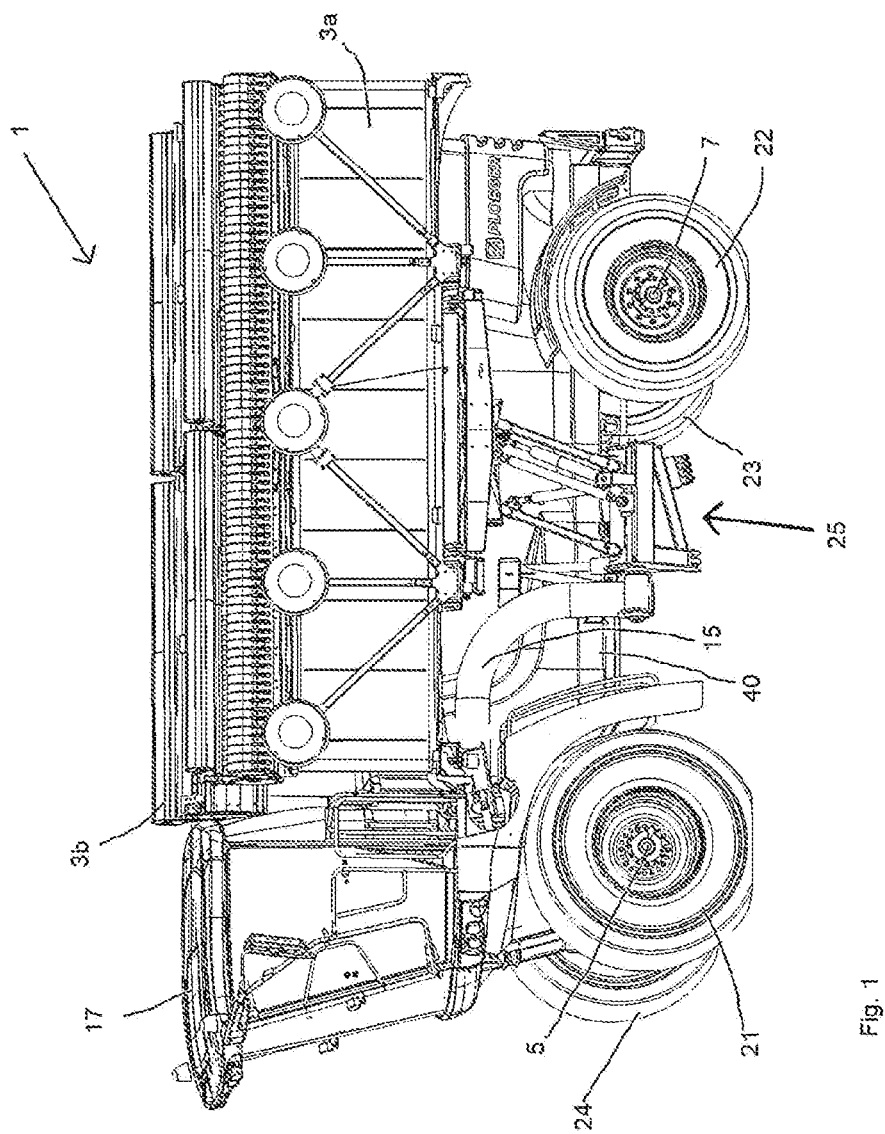
FIG. 1 shows a side view of a self-propelled merger in the transportation operating mode.
Figure 2A:
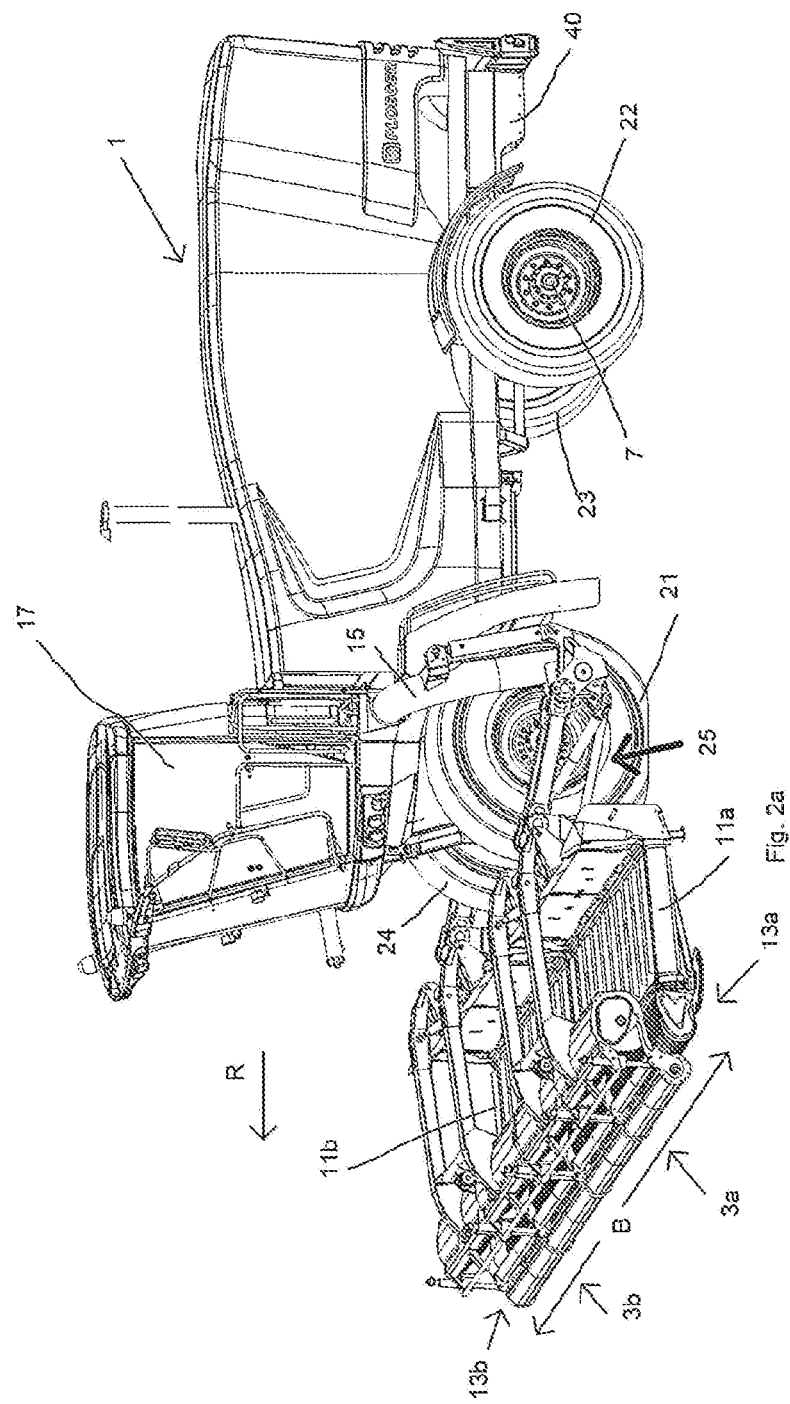
FIGS. 2a, b show a side view of a self-propelled merger in the operating mode for performing an agricultural operation on the land, more particularly forming a windrow on the land, wherein, in FIG. 2a, the units are arranged close to each other and, in FIG. 2b, the units are at a distance from each other.

FIGS. 1 and 2a, b show a self-propelled agricultural machine, more particularly a self-propelled merger 1 (or belt rake). Although the invention described in the claims is particularly suitable for use in a self-propelled merger 1, the invention described in the claims may also be used in other self-propelled forage-harvesting machines or self-propelled agricultural machines, in particular agricultural machines where it is advantageous if the working width between two units in the working position can be varied.

The merger 1 is provided with at least one motor (not shown), comprising two elongate units 3a, 3b, with a first wheel axle 5 (front wheel axle) and a second wheel axle 7 (rear wheel axle) situated at a distance from the first wheel axle 5. The first wheel axle 5 and the second wheel axle 7 are drivable by means of the motor in order to move the merger 1 across land or on public roads. As an alternative, only the first 5 or the second wheel axle 7 is drivable by means of the motor. The first wheel axle 5 and/or the second wheel axle 7 may be designed to be steerable in order to steer the agricultural machine in the field or on the road.

In use, an agricultural operation on the land can be performed by means of the two elongate units 3a, 3b. More particularly, each illustrated elongate unit 3a, 3b is provided with a conveyor belt 11a, 11b and with a product-picking mechanism 13a, 13b for picking up a plant material-product from the land, for example for picking up hay or a similar product, and moving the product onto the conveyor belt 11a, 11b, by means of which the product can be deposited on the land again to the left or right of the merger with respect to the direction of travel R, as is indicated by arrow R in FIG. 2a, for example in order to form a windrow. A windrow is a row of plants which is deposited on the land by harvesting machines, such as the illustrated merger 1, for a subsequent operation. The subsequent operation may be, for example, shredding, pressing or gathering with a loader wagon. Space is cleared for the tyres/wheels 21, 22, 23, 24 of the merger 1 or another harvesting machine for a subsequent harvesting operation or for performing a subsequent agricultural operation on the land.

In the working position of the merger 1 shown in FIG. 2a, the conveyor belts 11a, 11b of the two elongate units 3a, 3b are positioned with respect to each other in such a way that the conveyor belts 11a, 11b can form a single entity for depositing the product to the left or right of the merger 1 with respect to the direction of travel R. Optionally, the conveyor belts 11a, 11b may deposit the product to the left and right of the merger 1 with respect to the direction of travel R. In the situation illustrated in FIG. 2*a*, the product, for example grass, is picked up along virtually the entire width B by means of the product-picking mechanisms 13*a*, 13*b* and deposited on the land again in rows via the conveyor belts 11*a*, 11*b*. In the working position, the two elongate units 3*a*, 3*b* are situated in front of the front wheel axle such that the wheels of the merger cannot drive across the product to be picked up, as the product for the machine is picked up by the units 3*a*, 3*b* and is deposited in such a manner that the wheels cannot come into contact with the grass deposited in rows by the units 3*a*, 3*b*. The width B is at least 1.5 times greater than the width between the outer sides of the front wheels or rear wheels of the merger 1.

In the merger 1, each elongate unit 3*a*, 3*b* is displaceable from a transportation position as is shown in FIG. 1 to a working position as is shown in FIGS. 2*a*, *b* and vice versa. In the transportation position of the units 3*a*, 3*b*, the maximum width of the merger 1 is smaller than the width B (FIG. 2*a*) in the working position of the units 3*a*, 3*b*. The merger 1 has a folding mechanism 15 for moving the elongate units 3*a*, 3*b* between the working position and the transportation position. Due to the elongate units, the merger 1 is at least 1.5 times wider in the working position than in the transportation position. The length of an elongate unit is 2.5-7.5 metres, usually approximately 5 metres. The folding mechanism 15 is hydraulic and will be explained further below. In the working position (FIGS. 2*a*, *b*), each elongate unit 3*a*, 3*b* encloses an angle of 90 degrees with the direction of travel of the agricultural machine, preferably this angle is between 80-100 degrees. In the transportation position (FIG. 1), each elongate unit 3*a*, 3*b* encloses an angle of 0 degrees with the direction of travel of the agricultural machine. This angle may vary between 0-15 degrees, preferably between 0-5 degrees. In the merger 1 shown in the figures, the angle, viewed from a top view (not shown), between the working position and the transportation position of each unit 3*a*, 3*b* is approximately 90 degrees. In other words, by means of the folding mechanism 15, the at least two elongate units 3*a*, 3*b* are situated in front of the front wheel axle 5 in the working position, whereas the at least two elongate units are largely or entirely situated behind the front wheel axle 5 in the transportation position.

The two elongate units 3*a*, 3*b* are of virtually identical design and are attached to the chassis 40 of the merger 1 in mirror-symmetrical fashion by means of the folding mechanism 15.

The merger 1 furthermore comprises a cab 17 which is positioned in such a way that it is situated above the first wheel axle 5 between the working position and the transportation position of the elongate units. In this way, the driver has an optimum view, both in the transportation mode (FIG. 1) of the merger 1 and in the working mode (FIGS. 2*a*, *b*) of the merger 1.

In the working position, each unit 3*a*, 3*b* is situated in front of the first wheel axle 5, whereas each unit 3*a*, 3*b* is largely or even entirely situated behind the first wheel axle 5 in the transportation position.

In the working position of the units 3*a*, 3*b*, the agricultural operation can be performed on the land substantially along the length of each elongate unit. In the working position illustrated in FIG. 2*a*, the sum total of the lengths of the units 3*a*, 3*b* equals the width B. The two elongate units 3*a*, 3*b* are each provided with a displacement unit 25 by means of which, in the working position, the distance A (FIG. 2*b*) between the at least two elongate units 3*a*, 3*b* viewed in the longitudinal direction, illustrated by arrow B, of the two elongate units can be adjusted.

Figure 3:
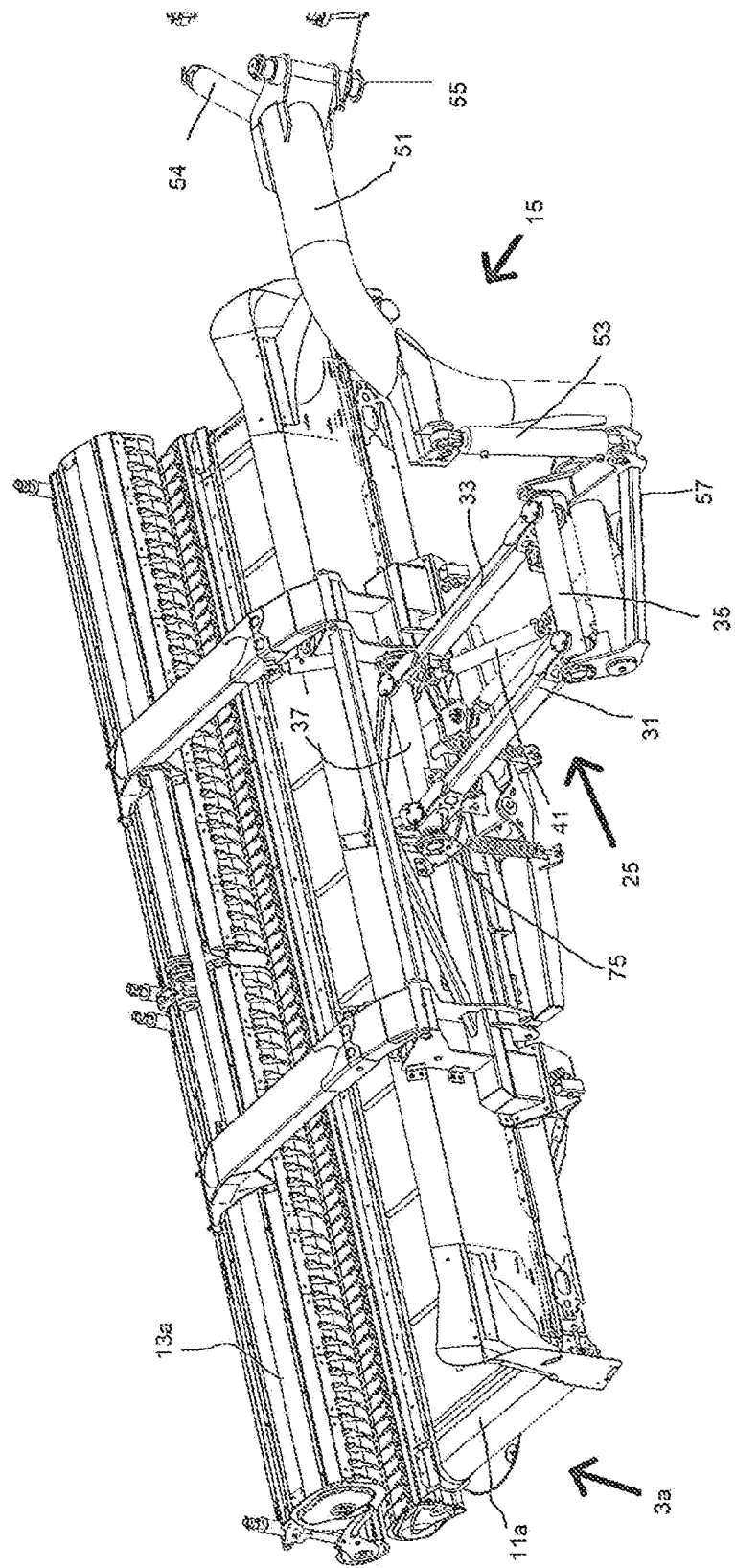
FIG. 3 shows details of a folding mechanism and of a displacement unit for an elongate unit of the merger shown in FIGS. 1 and 2a, b.
Figure 4A:
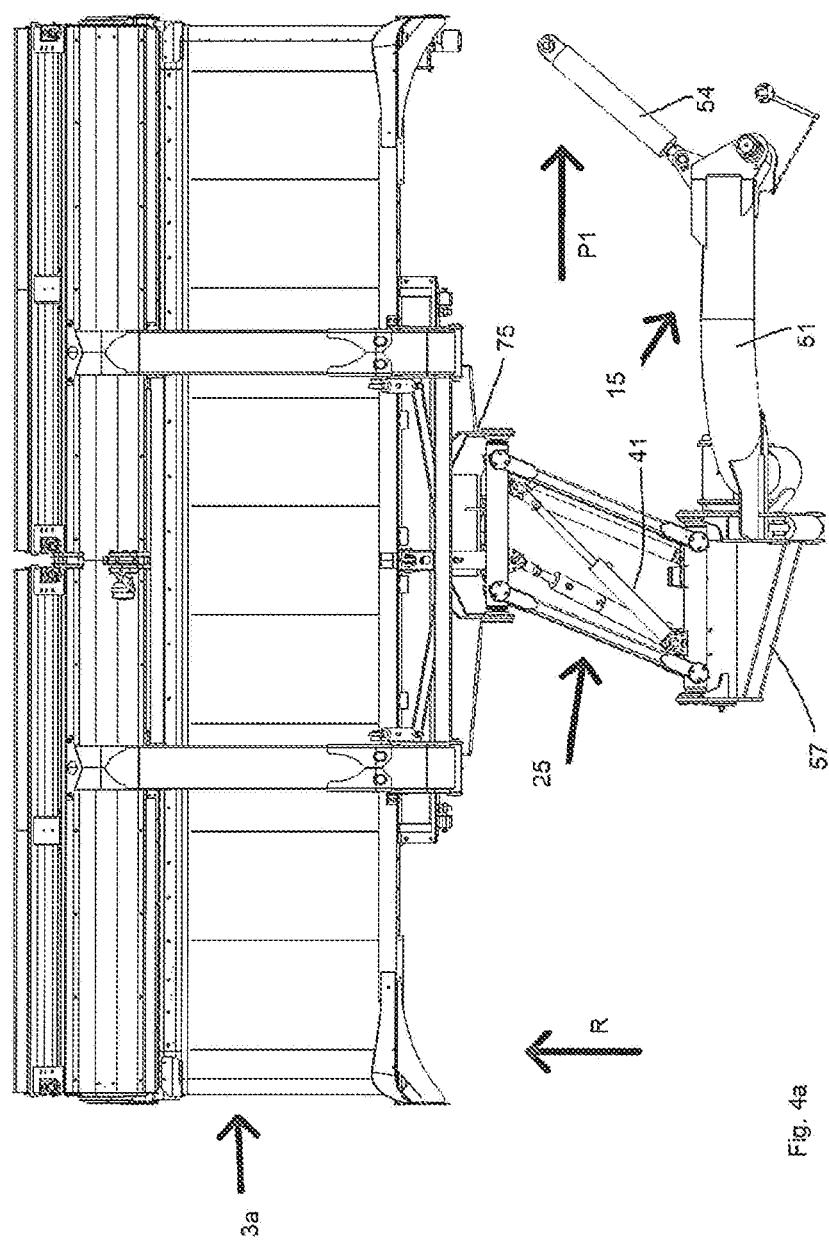

The details of the displacement unit 25 are shown in FIG. 3, whereas the operation thereof is illustrated in FIGS. 4*a*-*c*, as will be discussed in more detail below.

FIGS. 4*a*-*c* show that, by means of the displacement unit 25, the elongate unit 3*a*, in its working position, is displaceable from a centre position as shown in FIG. 4*b* to the left, in the direction of arrow P2 (FIG. 4*c*), with respect to the direction of travel R, to a first end position as shown in FIG. 4*c*, and is also displaceable from a centre position (FIG. 4*b*) to the right, in the direction of arrow P1 (FIG. 4*a*), with respect to the direction of travel R, to a second end position as shown in FIG. 4*a* in order to vary the distance between the units 3*a*, 3*b* in the working position.

Although FIGS. 3-9*b* only show the displacement unit 25 of the elongate unit 3*a*, the elongate unit 3*b* may also be provided with a displacement unit corresponding to/identical with the displacement unit 25 (as is shown, for example, in FIG. 2*b*) which is arranged on the merger 1 in mirror-symmetrical fashion. Each unit 3*a*, 3*b* is connected to the chassis 40 of the agricultural machine 1 via a displacement unit 25 and a folding mechanism 15. The displacement unit 25 is arranged between the folding mechanism 15 and the elongate unit 3*a*, 3*b*.

As is shown in FIGS. 3-4*c*, the displacement unit 25 comprises a system of rods (or linkage) 31, 33, 35, 37 and at least one drive member 41.

Viewed in plan view, the system of rods 31, 33, 35, 37 is arranged in a parallelogram. The system of rods is formed by at least two rods/bars 35, 37 which, in the working position of the unit 3*a*, extend substantially at right angles to the direction of travel R and are connected to at least two intermediate rod arms 31, 33 by means of pivot joints, wherein one end of the drive member 41 is pivotably connected to this rod 35 which is situated furthest from the unit 3*a*, and another, opposite end is pivotably connected to the rod arm 33 near the rod 37. The drive member 41, more particularly a hydraulic cylinder, is arranged substantially diagonally in the parallelogram, as is visible from the plan views shown in FIGS. 4*a*-*c*. In this way, it is possible to displace the relatively heavy unit in the working position using only a single drive member as is indicated in FIGS. 4*a*-4*c*.

Referring to, for example, FIG. 3, each folding mechanism 15 comprises an arm 51, a first drive element 53 which is pivotably connected to the arm 51 and to a tilting piece 57 of the displacement unit 25. By means of a second drive element 54, the arm 51 is connected to the frame of the chassis 40 of the merger 1 so as to be rotatable about a rotation axle 55.

Figure 7A:
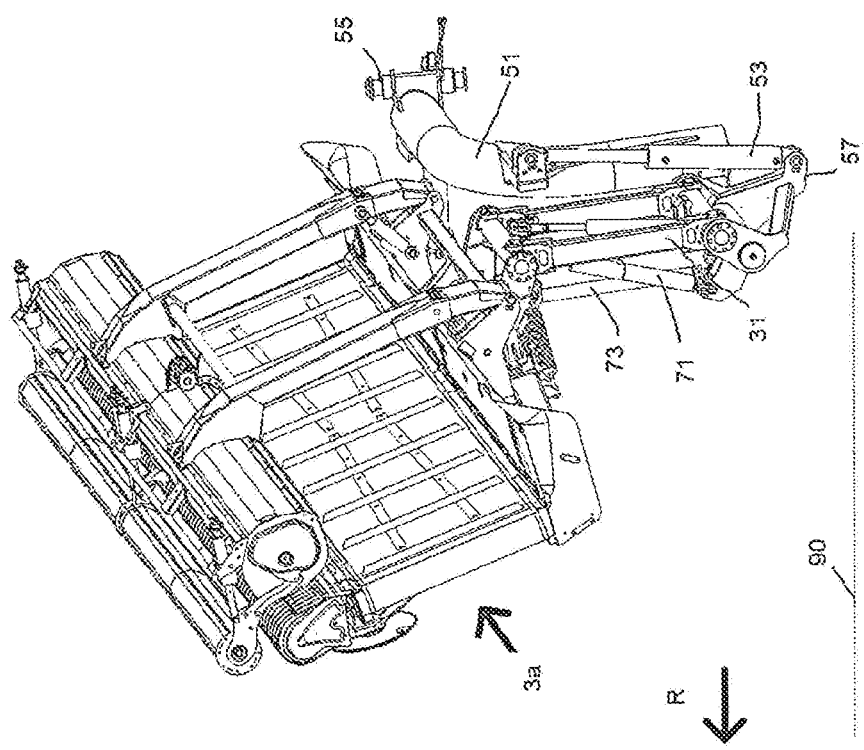
Figure 9A:
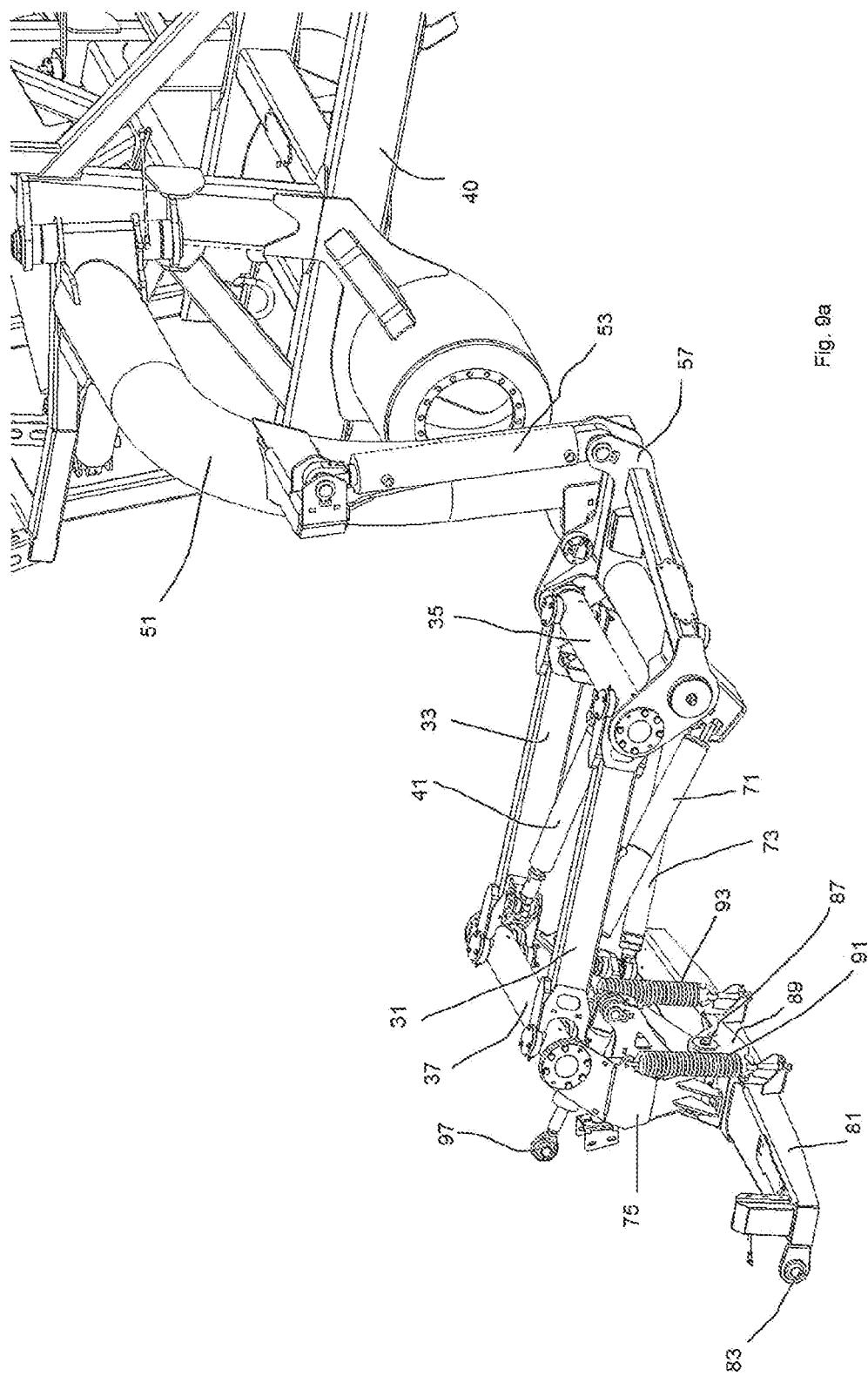
FIGS. 9a, b show the folding mechanism and the displacement unit without the elongate unit.
Figure 9B:
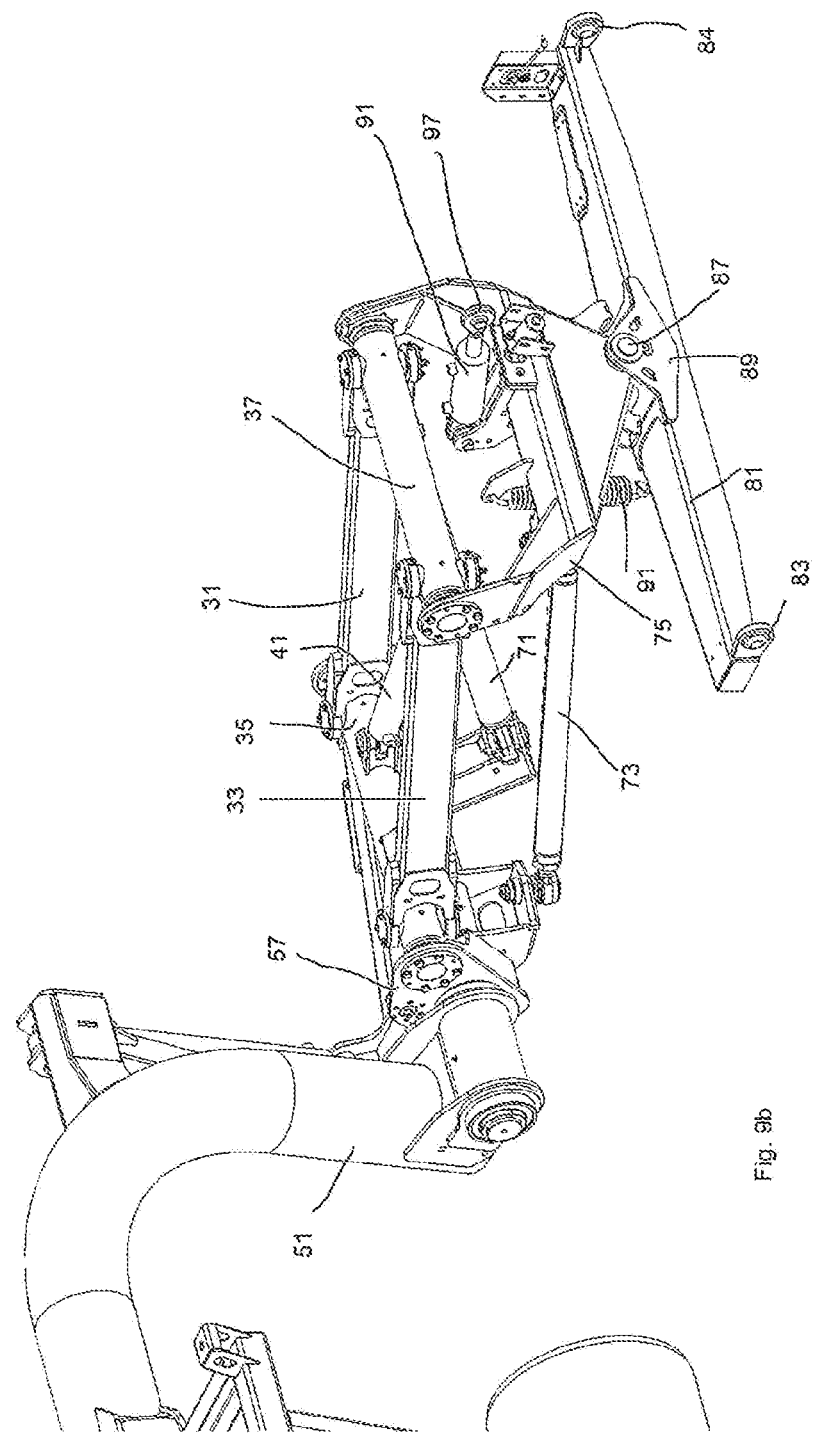

By means of the first drive element 53, the unit 3*a*, together with the displacement unit 25, can be folded from the working position, see FIG. 7*b*, to a folded-in position with respect to the ground 90, see FIG. 7*a*, at a certain height from the ground and vice versa. Obviously, it is also possible for the first drive element 53 to be operated in such a way that, if desired or if circumstances require, an intermediate position between the positions shown in FIGS. 7*a* and 7*b* can be assumed/taken. Such an operable first drive element 53 provides the merger 1 with a relatively large flexibility to temporarily lift the units 3*a*, 3*b*, for example in order to pass obstacles.

By means of the second drive element 54, the arm 51, together with the unit 3*a* and the displacement unit 25, can be rotated about the rotation axle 55 from the folded-in position shown in FIG. 7*a* to the transportation position shown in FIG. 1. Conversely, by operating the second drive element 54 and thus rotating the arm 51 about the rotation axle 55, the units 3a, 3b can be brought from the transportation position of the units shown in FIG. 1 to the position shown in FIG. 7a. By operating the first drive element 53, the units 3a, 3b are subsequently folded, together with the displacement units 25 attached thereto, from the position shown in FIG. 7a to the position shown in FIGS. 2a, b and 7b. This position corresponds to the working position of the elongate units 3a, 3b.

In the position shown in FIGS. 2a and 7b, the first unit 3a is in the position shown in FIG. 4a and the second unit 3b (not shown) is in a position corresponding to that shown in FIG. 4c, so that there is virtually no distance between the units 3a, 3b in the working position, as is illustrated in FIG. 2a. Although in the shown merger 1 both elongate units 3a, 3b are connected to the chassis 40 or the frame of the merger 1 via a displacement unit 25, it is also possible, in a alternative embodiment of the invention, to only provide one of the two units 3a, 3b with a displacement unit 25.

Figure 2B:
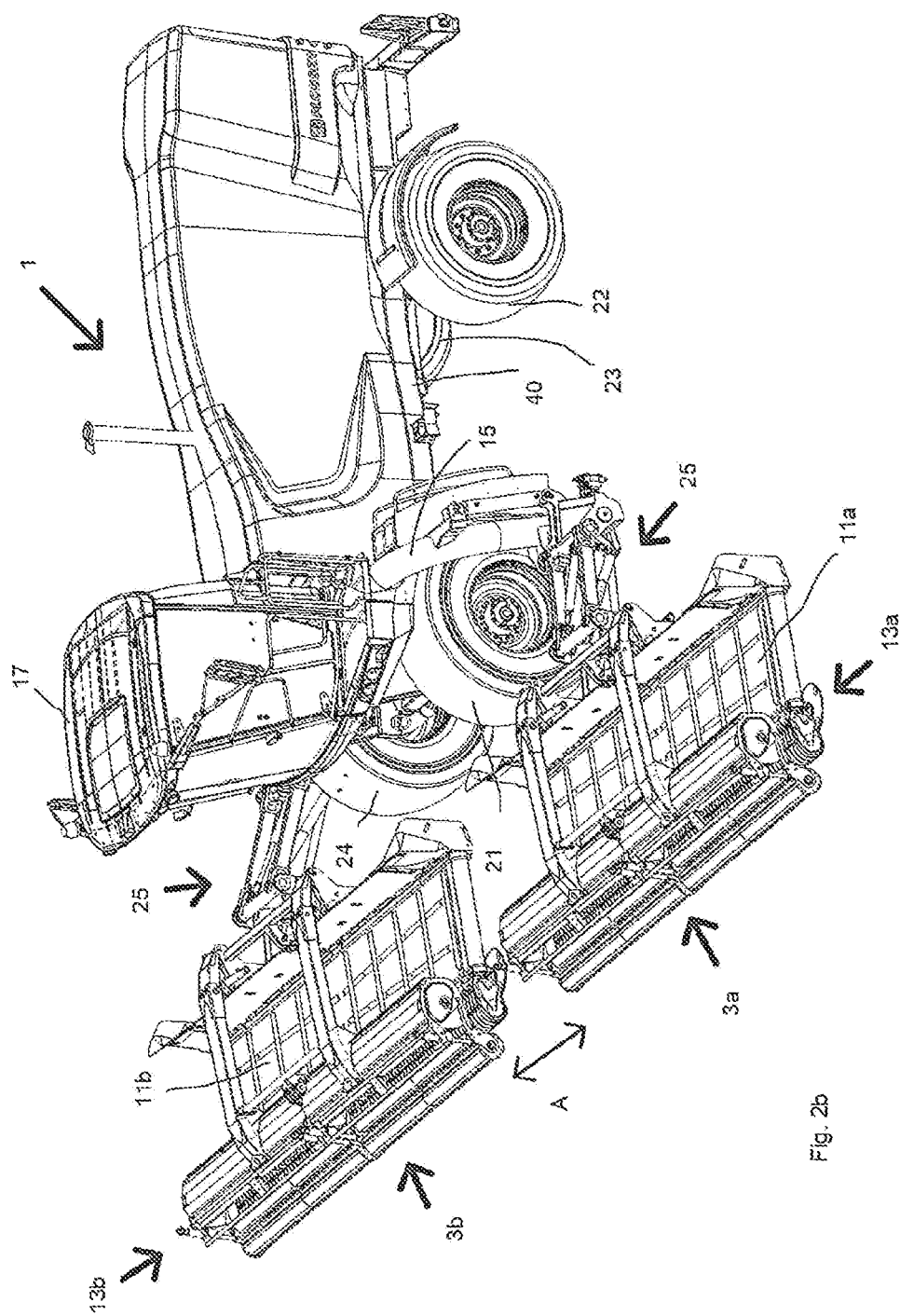

From the positions of the units 3a, 3b illustrated in FIG. 2a, the units 3a, 3b may be moved apart by means of the displacement units 25, so that a distance A is created between the units 3a, 3b in the working position, as is illustrated in FIG. 2b.

The distance between the units 3a, 3b in the working position is at its greatest if the first unit 3a is moved to the left P2 with respect to the direction of travel R to the greatest extent (FIG. 4c) and the second unit 3b (not shown) is moved to the right with respect to the direction of travel R to the greatest extent. As will be clear, due to the positions of the unit 3a illustrated in FIGS. 4a-c, the distance between no or virtually no distance and the maximum distance between the units 3a, 3b can be varied.

If there is a predetermined distance of, for example, 1.5 metres between the units 3a, 3b in the working position, a product may be picked up off the land by means of the product-picking mechanism 13a, 13b and may be moved to the right with respect to the direction of travel R of the merger 1 in the direction of the second unit 3b by means of the conveyor belt 11a of the unit 3a in order to form a central windrow, for example in order to form a windrow between the wheels 21, 22, 23, 24 of the merger 1. In this situation, such a central windrow may also be achieved by the second unit 3b by moving the product to the left with respect to the direction of travel R of the merger 1, in the direction of the first unit 3a, by means of the conveyor belt 11b of the unit 3b.

The first and the second drive element 53, 54 of the folding mechanism are both designed as a hydraulic cylinder. Such hydraulic cylinders are inexpensive and reliable. If desired, other drive elements known to those skilled in the art may be used.

Figure 5:
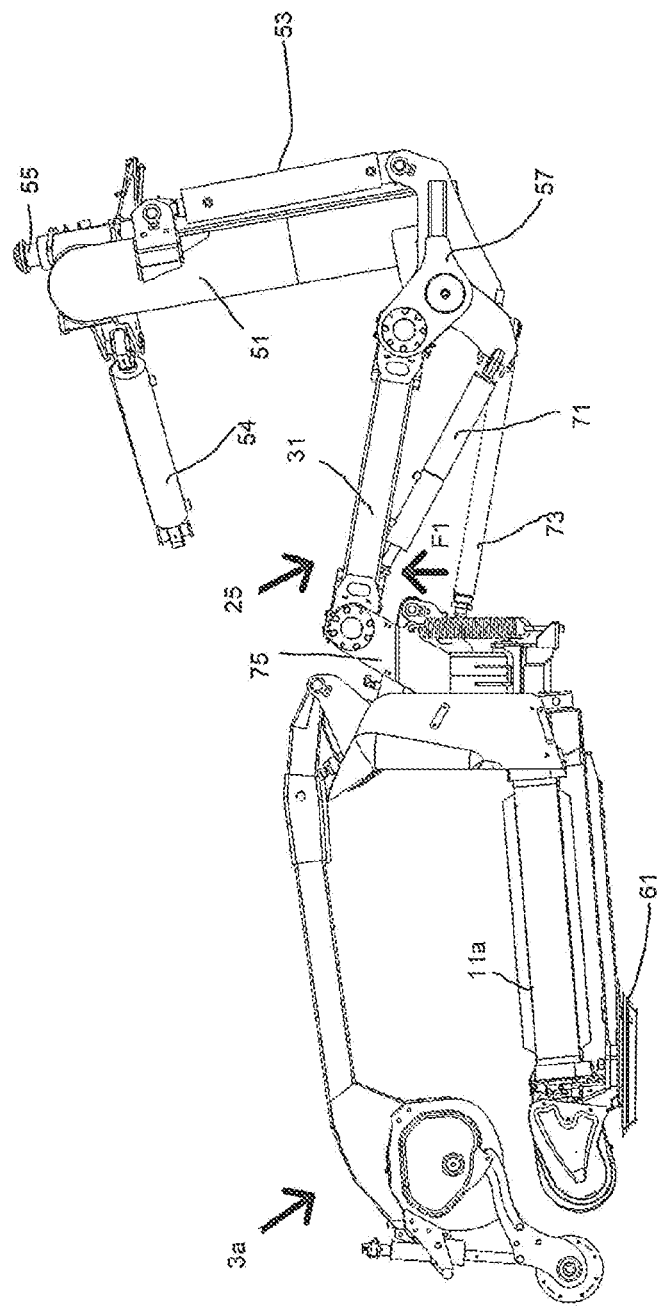
FIG. 5 shows a side view of the folding mechanism, the displacement unit and the elongate unit of the merger shown in FIGS. 1 and 2a, b.

The displacement unit 25 is furthermore provided with a pressure-regulating mechanism described by means of FIGS. 5 and 6 in order to vary the load on ground-contacting elements 61 of the unit in the working position of the unit 3a, in particular in order to lower the load in a constant way.

The pressure-regulating mechanism comprises at least one hydraulic cylinder 71 and a parallel arm 73. At one end, the parallel arm 73 is connected to the tilting piece 57 and at the other end to a carrying mechanism 75. One end of the hydraulic cylinder 71 is connected to the tilting piece 57 and the other end to the carrying mechanism 75. The rod 35 of the system of rods of the displacement unit is also connected to the tilting piece 57 and the opposite rod 37 is connected to the carrying mechanism for carrying the unit 3a. Viewed from a side view, the higher rod arm 31, together with the lower parallel arm 73 which extends parallel to the rod arm 31, together with the carrying mechanism 75 and the tilting piece 57, forms a parallelogram. In this parallelogram, the hydraulic cylinder 71 extends diagonally, as is shown in FIG. 5, from a position near the tilting piece 57 which is situated lower than the system of rods 31, 33, 35, 37 of the displacement unit 25 to a position near the carrying mechanism 75 virtually at the same height as the system of rods 31, 33, 35, 37. By means of the hydraulic cylinder 71, a force F1 can be generated by means of which the weight of the unit 3a can be largely or even completely supported. In principle, the force F1 which can be generated by the hydraulic cylinder 71 is such that the load on each of the ground-contacting elements 61 is only 25% of the mass of the unit 3a at most, preferably at most 10% of the mass of the unit 3a. By means of the pressure-regulating mechanism, the pressure of the unit 3a on the ground-contacting elements 61 can be kept relatively constant, irrespective of the height of the unit 3a with respect to the land. The hydraulic cylinder 71 is provided with an accumulator (not shown), so that, in use, the cylinder 71 can be kept at a virtually constant operating pressure, and with an adjustable pressure-reducing valve (not shown) for setting the desired pressure in the accumulator.

The displacement unit 25 furthermore comprises a swinging member 81 which is attached to the carrying mechanism 75. The swinging member 81, see in particular FIG. 9b, comprises two fastening positions 83, 84 to which the elongate unit 3a can be attached. The swinging member 81 is pivotably connected to the carrying mechanism 75 of the displacement unit 25 via a coupling piece 89 which is pivotable about a pivot pin 87 and is furthermore connected to the carrying mechanism 75 of the displacement unit 25 via two springs 91, 93 between which the pivot pin 87 is situated. The coupling piece 89 and the swinging member 81 form a single entity which is attached to the pivot pin 87. Such a pivotably swinging member 81 ensures that the unit 3a follows the ground contour particularly reliably, in particular in the length direction thereof. The springs 91, 93 are damping elements. It would also be possible to use rubber springs or hydraulic cylinders instead of springs 91, 93 as damping element. The springs 91, 93 ensure that the unit 3a, b will not be left tilted at an (undesired) angle in the air if the unit 3a, 3b is lifted off the terrain.

The displacement unit 25 is also provided with a displacement mechanism 95 in the form of a hydraulic cylinder. At one end, this displacement mechanism 95 is pivotably connected to the carrying mechanism 75 of the displacement unit and, at the other end 97, it is connected to the unit 3a, in which case the angle of inclination of the unit 3a, viewed in the direction of travel, can be varied with respect to the ground by activating the displacement mechanism 95, so that the working depth of the product-picking mechanism 13a can be adjusted.

By means of the mechanisms shown in the figures, a merger 1 with a considerable functionality may be provided, which is to say:
- a left/right adjustment, or so-called side-shift, of the elongate unit 3a, 3b in the working position by means of the displacement unit 25 in the form of a system of rods which is arranged in a parallelogram, viewed from a plan view, and comprises a drive member 41;
- a pressure relief by means of a pressure-regulating mechanism which comprises a mechanism which, viewed from a side view, is arranged as a parallelogram and comprises a hydraulic cylinder 71, wherein the units 3a, 3b can, by means of the pressure-regulating mechanism, be moved across the land more easily for performing the agricultural operation using the product-picking mechanisms 13a, 13b;

an improved ground-contour following ability of the elongate units 3a, 3b in the working position by means of the above-described swinging member 81 shown in the figures;

folding mechanism 15 for folding the units 3a, 3b in and out between a transportation position, so that the agricultural machine has a maximum width which, for example, meets the requirements for driving on public roads, and a working position in which the units 3a, 3b are as wide as possible in order to be able to carry out the agricultural operation as efficiently as possible within a certain period of time;

a displacement mechanism 95 for tilting the product-picking mechanisms 13a, 13b forwards or backwards in order to optimize picking up the product from the land, depending on the circumstances.

The left/right adjustment of each elongate unit 3a, 3b, in combination with the direction of rotation of the conveyor belt 11a, 11b, which is able to transport the product situated thereon to the left with respect to the direction of travel R as well as to the right, makes a large number of depositing combinations possible. In this way, the units 3a, 3b, in the working position, are able to assume different configurations in order to be able to perform the agricultural operation on the land, more particularly for depositing the product on the land. Thus, it is possible for both conveyor belts 11a, 11b of the units 3a, 3b, in the working position, to be positioned against each other without any distance in between with respect to each other. In this position of the conveyor belts 11a, 11b, both conveyor belts 11a, 11b are able to rotate to the right or both are able to rotate to the left in order to deposit the product on the land or both conveyor belts 11a, 11b are able to rotate outwardly in opposite directions to each other in order to deposit the product on the land on both the left-hand and the right-hand side. Another possibility is for both conveyor belts 11a, 11b of the units 3a, 3b, in the working position, to be moved a distance apart from each other by means of the displacement units 25, so that a clear space is formed in between. In addition, the distance can be adjusted to a desired distance by means of the displacement unit 25. In this position of the conveyor belts 11a, 11b "a distance apart from each other", both conveyor belts 11a, 11b may rotate inwardly (central windrow) or both may rotate to the right or left to deposit the product on the land or both conveyor belts 11a, 11b may rotate outwardly in opposite directions to each other in order to deposit the product on the land on both the left-hand and the right-hand side. As a result thereof, a merger 1 can be provided which is very flexible with regard to its working width, which offers advantages for optimizing the subsequent operation(s) to be performed on the land.

The invention claimed is:

1. A self-propelled agricultural machine, which self-propelled agricultural machine is provided with at least one motor, at least two elongate units for, in use, performing an agricultural operation on the land, a front wheel axle and a rear wheel axle situated at a distance from the front wheel axle,
wherein the front wheel axle and/or the rear wheel axle can be driven by means of the motor for displacing the agricultural machine,
wherein each elongate unit is displaceable from a transportation position to a working position and vice versa by means of a folding mechanism, so that the maximum width of the self-propelled agricultural machine is smaller in the transportation position of the units than in the working position of the units,
wherein, in the working position, the agricultural operation on the land can be performed substantially along the length of each elongate unit, wherein at least one of the at least two elongate units is provided with a displacement unit by means of which, in the working position, the distance between the at least two elongate units is adjustable, viewed in the longitudinal direction of the at least two elongate units,
wherein the displacement unit is attached to the elongate unit by means of a swinging member comprising two spaced fastening positions to which the elongate unit is attached, wherein the swinging member comprises between the two spaced fastening positions a coupling piece which is pivotably connected to the displacement unit about a pivot pin.

2. The self-propelled agricultural machine according to claim 1, wherein each unit is provided with a conveyor belt and with a product-picking mechanism for picking up a product from the land, and moving the product onto the conveyor belt, by means of which the product can be displaced to the left or right with respect to the direction of travel of the agricultural machine, in order to form a window.

3. The self-propelled agricultural machine according to claim 2, wherein the two elongate units, in the working position, can be positioned with respect to each other without or virtually without any distance in between them, so that the product can be displaced to the left and/or to the right with respect to the direction of travel of the agricultural machine by means of the conveyor belts of the two elongate units.

4. The self-propelled agricultural machine according to claim 1 wherein, in the working position, the at least two elongate units are situated in front of the front wheel axle, while, in the transportation position, the at least two elongate units are completely situated behind the front wheel axle.

5. The self-propelled agricultural machine according to claim 4, wherein, in the working position, each elongate unit encloses an angle of 80-100 degrees with the direction of travel of the agricultural machine, wherein, in the transportation position, each elongate unit encloses an angle of 0-15 degrees with the direction of travel of the agricultural machine.

6. The self-propelled agricultural machine according to claim 1, wherein the elongate unit, in its working position, is displaceable by means of the displacement unit from a centre position to the left with respect to the direction of travel to a first end position and is also displaceable from a centre position to the right with respect to the direction of travel to a second end position in order to vary the distance between the units.

7. The self-propelled agricultural machine according to claim 1, wherein the at least one displacement unit is arranged between the folding mechanism and the elongate unit.

8. The self-propelled agricultural machine according to claim 1, wherein the agricultural machine comprises two displacement units, wherein each displacement unit is assigned to one of the two elongate units.

9. The self-propelled agricultural machine according to claim 1, wherein the displacement unit comprises a system of rods and at least one drive member.

10. The self-propelled agricultural machine according to claim 9, wherein the system of rods is arranged in a parallelogram.

11. The self-propelled agricultural machine according to claim 9, wherein the system of rods is formed by at least two rods which, in the working position of the unit, extend substantially at right angles to the direction of travel and are connected to at least two intermediate rod arms by means of pivot joints, wherein one end of the drive member is pivotably connected to one of the rods, and the other, opposite end is pivotably connected to one of the two rod arms near the other rod or directly to the other rod.

12. The self-propelled agricultural machine according to claim 10, wherein the drive member is arranged substantially diagonally in the parallelogram.

13. The self-propelled agricultural machine according to claim 1, wherein each folding mechanism is provided with an arm, with a first drive element which is connected to the arm which is connected to the frame of the self-propelled agricultural machine, which arm is rotatable by means of a second drive element, wherein the unit can be folded from the working position to a folded-in position at a certain height from the ground and vice versa by means of the first drive element, wherein the arm can be rotated, together with the unit, from the folded-in position to the transportation position and vice versa by means of the second drive element.

14. The self-propelled agricultural machine according to claim 1, wherein the displacement unit is provided with a pressure-regulating mechanism in order to regulate, in the working position of the unit, the pressure load of ground-contacting elements of the unit.

15. The self-propelled agricultural machine according to claim 14, wherein the pressure-regulating mechanism comprises at least one hydraulic cylinder.

16. The self-propelled agricultural machine according to claim 14, wherein the pressure-regulating mechanism comprises a parallel arm which is connected to a tilting piece at one end and is connected to a carrying mechanism at the other end.

17. The self-propelled agricultural machine according to claim 16 wherein, viewed from a side view, the parallel arm comprising the system of rods, the tilting piece and the carrying mechanism, in the working position of the elongate unit, is in the form of a parallelogram.

18. The self-propelled agricultural machine according to claim 1, wherein the swinging member is furthermore connected to the displacement unit by two damping elements, wherein the pivot pin is situated between the two damping elements.

19. The self-propelled agricultural machine according to claim 16, wherein the carrying mechanism of the displacement unit is connected to the swinging member.

20. The self-propelled agricultural machine according to claim 1, wherein the agricultural machine is furthermore provided with a displacement mechanism which, at one end, is connected to the displacement unit and, at the other end, is connected or can be connected to the elongate unit, wherein the angle of inclination of the unit with respect to the ground, viewed in the direction of travel, can be varied by activation of the displacement mechanism.

21. The self-propelled agricultural machine according to claim 1, wherein the two units are of virtually identical design and each unit is connected to the chassis of the agricultural machine via the displacement unit.

22. Use of a self-propelled agricultural machine according to claim 1.

* * * * *